US010428666B2

(12) United States Patent
Forbes et al.

(10) Patent No.: US 10,428,666 B2
(45) Date of Patent: Oct. 1, 2019

(54) TURBINE VANE ASSEMBLY

(71) Applicant: United Technologies Corporation, Farmington, CT (US)

(72) Inventors: John David Forbes, Manchester, CT (US); Gregory Anselmi, Vernon, CT (US); Christina E. Botnick, East Hartford, CT (US); Eleanor D. Kaufman, Rocky Hill, CT (US); Jeffrey Leon, Glastonbury, CT (US); Jeffrey R. Levine, Vernon Rockville, CT (US); Gerald M. Mace, Wallingford, CT (US); Daniel C. Nadeau, Wethersfield, CT (US); Tania Bhatia Kashyap, West Hartford, CT (US); Richard N. Allen, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 336 days.

(21) Appl. No.: 15/375,827

(22) Filed: Dec. 12, 2016

(65) Prior Publication Data
US 2018/0163551 A1    Jun. 14, 2018

(51) Int. Cl.
*F01D 9/04*        (2006.01)
*F01D 9/06*        (2006.01)

(52) U.S. Cl.
CPC .............. *F01D 9/041* (2013.01); *F01D 9/065* (2013.01); *F05D 2240/80* (2013.01); *F05D 2240/81* (2013.01); *F05D 2250/74* (2013.01); *F05D 2260/202* (2013.01)

(58) Field of Classification Search
CPC ...... F01D 9/041; F01D 9/065; F05D 2250/74; F05D 2240/81; F05D 2260/202; F05D 2240/80
USPC ......................................... 415/115
See application file for complete search history.

(56) References Cited

U.S. PATENT DOCUMENTS

| 4,863,348 A * | 9/1989 | Weinhold ................ F01D 5/145 416/92 |
| 7,806,650 B2 * | 10/2010 | Heyward ................ F01D 9/041 415/115 |
| 2002/0076324 A1 * | 6/2002 | Abuaf ..................... F01D 5/187 416/1 |
| 2005/0031449 A1 * | 2/2005 | Cleveland ............... F01D 5/141 416/97 R |

(Continued)

FOREIGN PATENT DOCUMENTS

| WO | 2014007934 A1 | 1/2014 |
| WO | 2014035516 A2 | 3/2014 |

*Primary Examiner* — J. Todd Newton
(74) *Attorney, Agent, or Firm* — Cantor Colburn LLP

(57) ABSTRACT

A turbine vane includes an inner platform and an outer platform joined together by an airfoil. The airfoil has a leading edge and a trailing edge joined together by a pressure side and a suction side disposed opposite the pressure side. The inner platform defines a plurality of first inner cooling holes and a plurality of second inner cooling holes that are fluidly connected to an inner cooling passage. The plurality of first inner cooling holes are disposed proximate the leading edge and extend towards the suction side and the plurality of second inner cooling holes are disposed proximate the trailing edge and the suction side and extend towards the leading edge.

20 Claims, 4 Drawing Sheets

(56) References Cited

U.S. PATENT DOCUMENTS

| | | | | |
|---|---|---|---|---|
| 2005/0204741 A1* | 9/2005 | Simons | F01D 9/023 | 60/752 |
| 2007/0183895 A1* | 8/2007 | Sheffield | F01D 5/141 | 416/223 R |
| 2007/0183896 A1* | 8/2007 | Jay | F01D 5/141 | 416/223 R |
| 2010/0129196 A1* | 5/2010 | Johnston | F01D 5/188 | 415/115 |
| 2013/0164116 A1* | 6/2013 | Tardif | F01D 9/041 | 415/115 |
| 2014/0000287 A1* | 1/2014 | Spangler | F01D 25/12 | 60/806 |
| 2014/0010632 A1* | 1/2014 | Spangler | F01D 5/186 | 415/115 |
| 2014/0123676 A1* | 5/2014 | Jackson | F02C 7/18 | 60/782 |
| 2015/0192021 A1* | 7/2015 | Spangler | F01D 5/186 | 416/96 R |
| 2015/0211376 A1* | 7/2015 | Riley | F01D 9/041 | 415/115 |
| 2016/0032764 A1* | 2/2016 | Tibbott | F01D 9/047 | 415/116 |
| 2016/0160654 A1* | 6/2016 | Ennacer | F01D 9/041 | 60/806 |
| 2016/0160656 A1* | 6/2016 | Bergman | F01D 9/041 | 60/806 |
| 2016/0177735 A1* | 6/2016 | Bradshaw | F01D 5/186 | 60/806 |
| 2016/0194966 A1* | 7/2016 | Bergman | F01D 5/186 | 60/806 |
| 2016/0201467 A1* | 7/2016 | Milligan | F01D 11/24 | 415/173.1 |
| 2016/0201473 A1* | 7/2016 | Spangler | F01D 5/186 | 60/806 |
| 2016/0245093 A1* | 8/2016 | Deibel | F01D 9/041 | |
| 2017/0044931 A1* | 2/2017 | Lutjen | F01D 11/08 | |
| 2017/0198599 A1* | 7/2017 | Ryan | F01D 11/08 | |
| 2017/0198603 A1* | 7/2017 | Ryan | F01D 25/12 | |
| 2017/0370230 A1* | 12/2017 | Bahador | F01D 5/186 | |
| 2018/0106156 A1* | 4/2018 | LoRicco | F01D 9/065 | |
| 2018/0163551 A1* | 6/2018 | Forbes | F01D 9/065 | |

* cited by examiner

TURBINE VANE ASSEMBLY

BACKGROUND

Gas turbine engines are provided with turbine vanes that extend into a core flow path of the gas turbine engine. The turbine vanes generally do not rotate but guide airflow. The turbine vane is provided with cooling features to protect the turbine vane from the hot combustion gases. Some of the cooling features of the turbine vane may be subject to oxidation. Accordingly it is desirable to provide a turbine vane having cooling features that reduce turbine vane operating temperatures as well as mitigate oxidation.

BRIEF DESCRIPTION

According to an embodiment of the present disclosure, a turbine vane for a gas turbine engine is provided. The turbine vane includes an inner platform and an outer platform joined together by an airfoil. The airfoil has a leading edge and a trailing edge joined together by a pressure side and a suction side disposed opposite the pressure side. The inner platform defines a plurality of inner cooling holes at geometric coordinates substantial conformance with Cartesian coordinate values of $X_i$, $Y_i$, and $Z_i$ as set forth in Table 1, wherein each of the geometric coordinates is measured from an engine centerline, the Cartesian coordinate values of Table 1 are expressed in inches. The cooling holes have a diametrical surface tolerance relative to the specified coordinates of at least one of 0.022 inches (0.558 mm) and 0.017 inches (0.431 mm).

In addition to one or more of the features described above, or as an alternative to any of the foregoing embodiments, the plurality of inner cooling holes includes a plurality of first inner cooling holes and a plurality of second inner cooling holes that are fluidly connected to an inner cooling passage, the plurality of first inner cooling holes being disposed proximate the leading edge and extending towards the suction side and the plurality of second inner cooling holes being disposed proximate the trailing edge and the suction side and extending towards the leading edge.

In addition to one or more of the features described above, or as an alternative to any of the foregoing embodiments, the plurality of inner cooling holes further includes a plurality of third inner cooling holes that are fluidly connected to the inner cooling passage and are disposed proximate the trailing edge and the pressure side and extend towards the leading edge.

In addition to one or more of the features described above, or as an alternative to any of the foregoing embodiments, the plurality of first inner cooling holes has a first diameter and the plurality of second inner cooling holes has a second diameter that is less than the first diameter.

In addition to one or more of the features described above, or as an alternative to any of the foregoing embodiments, the outer platform defines a plurality of outer cooling holes at geometric coordinates substantial conformance with Cartesian coordinate values of $X_o$, $Y_o$, $Z_o$ as set forth in Table 2, wherein each of the geometric coordinates is measured from the engine centerline, the Cartesian coordinate values of Table 2 are expressed in inches. The cooling holes have a diametrical surface tolerance relative to the specified coordinates of at least one of 0.022 inches (0.558 mm) and 0.017 inches (0.431 mm).

In addition to one or more of the features described above, or as an alternative to any of the foregoing embodiments, wherein the plurality of outer cooling holes includes a plurality of first outer cooling holes and a plurality of second outer cooling holes that are fluidly connected to an outer cooling passage, the plurality of first outer cooling holes being disposed proximate the leading edge, and the plurality of second outer cooling holes being disposed proximate the trailing edge and the suction side extending towards the leading edge.

In addition to one or more of the features described above, or as an alternative to any of the foregoing embodiments, the plurality of outer cooling holes further includes a plurality of third outer cooling holes that are fluidly connected to the outer cooling passage, the plurality of third outer cooling holes are disposed proximate the pressure side and extend between the leading edge and the trailing edge.

In addition to one or more of the features described above, or as an alternative to any of the foregoing embodiments, a portion of the plurality of third outer cooling holes extend beyond the trailing edge and extend towards the suction side.

In addition to one or more of the features described above, or as an alternative to any of the foregoing embodiments, the plurality of first outer cooling holes has a first diameter and the plurality of second outer cooling holes has a second diameter that is less than the first diameter.

According to another embodiment of the present disclosure, a turbine vane for a gas turbine engine is provided. The turbine vane includes an inner platform, an outer platform, and an airfoil. The outer platform defines a plurality of outer cooling holes at geometric coordinates substantial conformance with Cartesian coordinate values of $X_o$, $Y_o$, $Z_o$ as set forth in Table 2, wherein each of the geometric coordinates is measured from an engine longitudinal axis, the Cartesian coordinate values of Table 2 are expressed in inches. The airfoil has a chord length that is defined between a leading edge and a trailing edge. The airfoil joins the inner platform to the outer platform. The cooling holes have a diametrical surface tolerance relative to the specified coordinates of at least one of 0.022 inches (0.558 mm) and 0.017 inches (0.431 mm).

In addition to one or more of the features described above, or as an alternative to any of the foregoing embodiments, the inner platform defines a plurality of inner cooling holes at geometric coordinates substantial conformance with Cartesian coordinate values of $X_i$, $Y_i$, and $Z_i$ as set forth in Table 1, wherein each of the geometric coordinates is measured from the engine longitudinal axis, the Cartesian coordinate values of Table 1 are expressed in inches. The cooling holes have a diametrical surface tolerance relative to the specified coordinates of at least one of 0.022 inches (0.558 mm) and 0.017 inches (0.431 mm).

In addition to one or more of the features described above, or as an alternative to any of the foregoing embodiments, the plurality of inner cooling holes includes a plurality of first inner cooling holes that extend circumferentially across the inner platform and are disposed proximate the leading edge.

In addition to one or more of the features described above, or as an alternative to any of the foregoing embodiments, the plurality of second inner cooling holes extend between 60% and 100% of the chord length.

In addition to one or more of the features described above, or as an alternative to any of the foregoing embodiments, the plurality of third inner cooling holes extend between 50% and 100% of the chord length.

In addition to one or more of the features described above, or as an alternative to any of the foregoing embodiments, the plurality of outer cooling holes includes a plurality of first outer cooling holes that extend circumferentially across the inner platform and are disposed proximate the leading edge.

In addition to one or more of the features described above, or as an alternative to any of the foregoing embodiments, the plurality of second outer cooling holes extend between 50% and 100% of the chord length.

In addition to one or more of the features described above, or as an alternative to any of the foregoing embodiments, the plurality of outer cooling holes includes a plurality of third outer cooling holes that extend between 0% and 100% of the chord length.

According to yet another embodiment of the present disclosure, a gas turbine engine is provided. The gas turbine engine includes a turbine section that is disposed adjacent to a combustor section. The turbine section includes a turbine vane having an inner platform and an outer platform joined together by an airfoil having a pressure side and a suction side each extending between a leading edge and a trailing edge. The inner platform defines a plurality of first inner cooling holes disposed proximate the leading edge and extend towards the suction side, a plurality of second inner cooling holes disposed proximate the trailing edge and the suction side, and a plurality of third inner cooling holes disposed proximate the trailing edge and the pressure side.

In addition to one or more of the features described above, or as an alternative to any of the foregoing embodiments, the outer platform defines a plurality of first outer cooling holes disposed proximate the leading edge, a plurality of second outer cooling holes disposed proximate the trailing edge and the suction side, and a plurality of third outer cooling holes disposed proximate the suction side and wrap around the trailing edge and extends towards the suction side.

In addition to one or more of the features described above, or as an alternative to any of the foregoing embodiments, the plurality of first outer cooling holes has a first diameter and the plurality of second outer cooling holes has a second diameter that is less than the first diameter.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
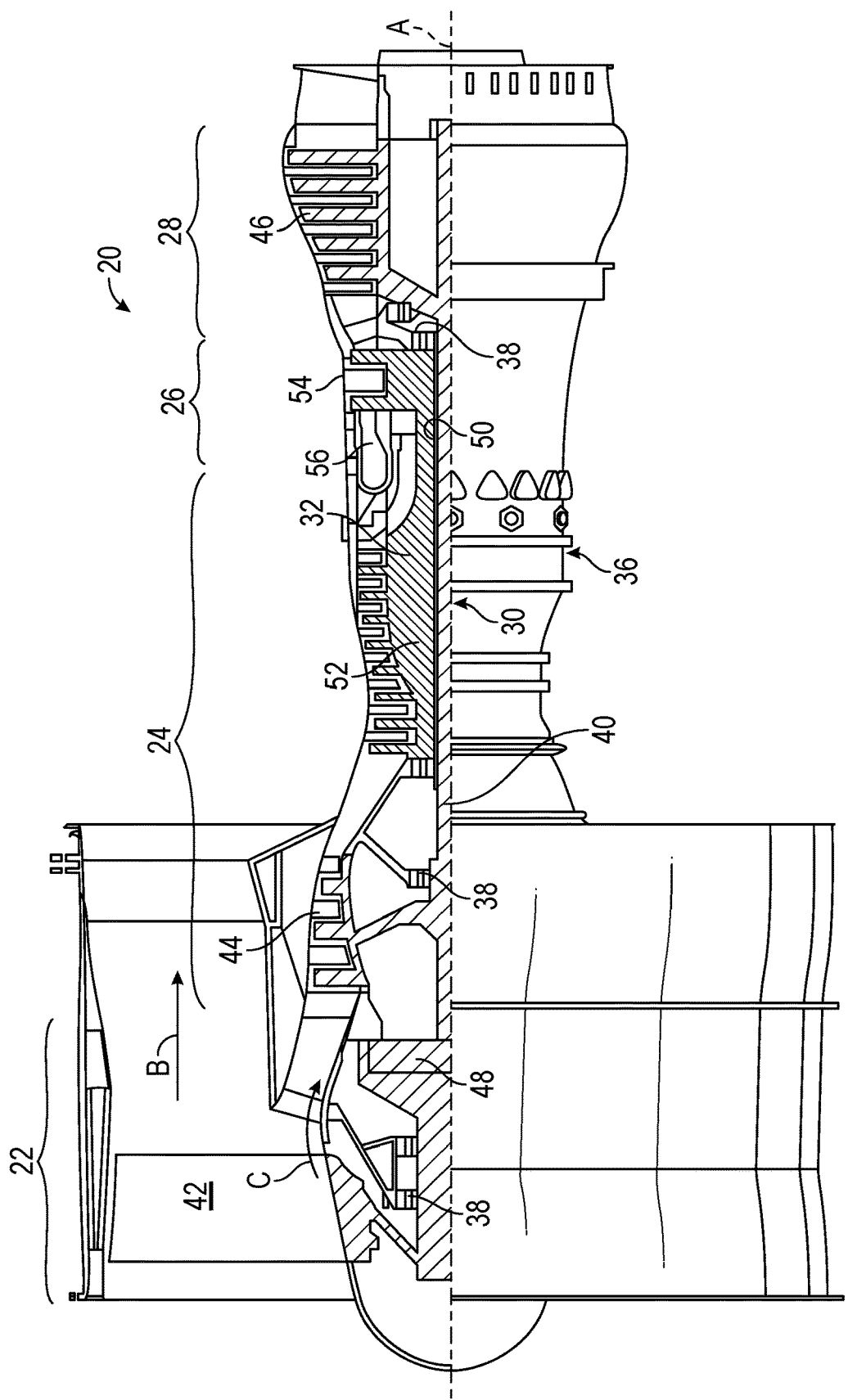
FIG. 1 is a schematic illustration of a gas turbine engine

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54.

A combustor 56 of the combustor section 26 is arranged in the gas turbine engine 20. The combustor 56 is arranged between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28.

The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
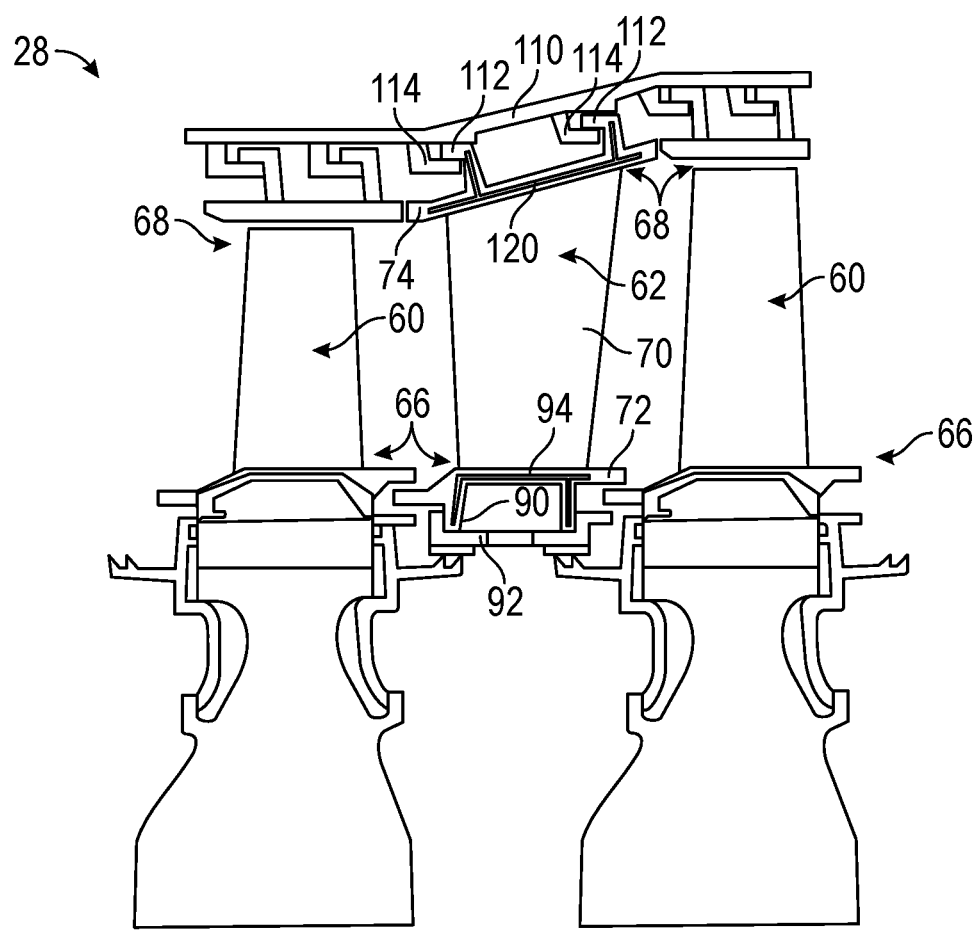
FIG. 2 is a cross-sectional view of a portion of the gas turbine engine.
Figure 3:
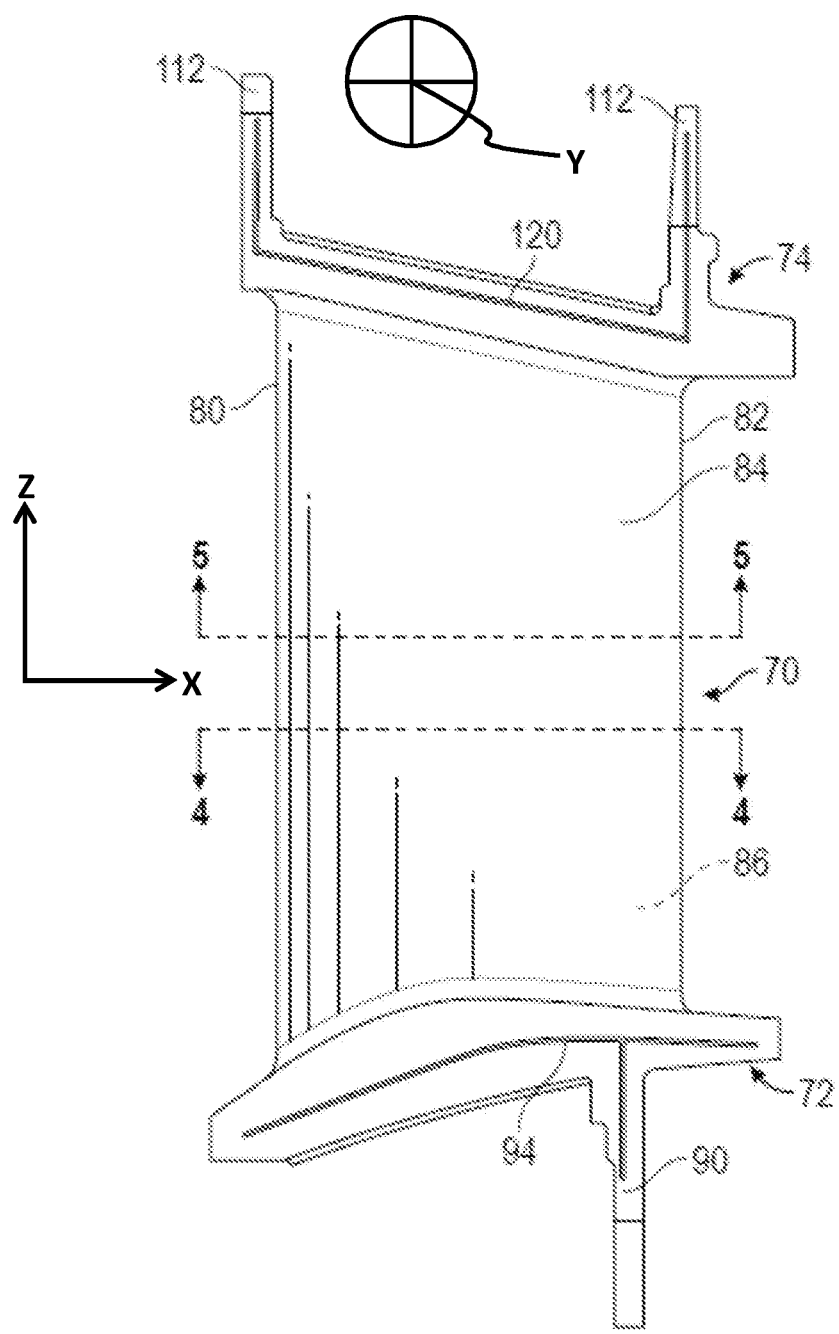
FIG. 3 is a perspective view of a turbine vane.

FIG. 2 is a schematic view of a portion of the turbine section 28 that may employ various embodiments disclosed herein. Turbine section 28 includes a plurality of airfoils including, for example, at least one blade 60 and at least one vane 62. The blade 60 or the vane 62 may be a hollow body with internal cavities defining a number of channels or cores, hereinafter airfoil cores, formed therein and extending from an inner diameter 66 to an outer diameter 68, or vice-versa. The airfoil cores may be separated by partitions within the blade 60 or the vane 62 that may extend between the inner diameter 66 and the outer diameter 68 of the blade 60 or the vane 62. The partitions may extend for a portion of the length of the blade 60 or the vane 62, but may stop or end prior to forming a complete wall within the blade 60 or the vane 62. Thus, each of the airfoil cores may be fluidly connected and form a fluid path within the blade 60 or the vane 62.

Referring to FIGS. 2-5, the vane 62 may include an airfoil 70 radially extending between an inner platform 72 and an outer platform 74. The airfoil 70 provides a leading edge 80, a trailing edge 82 disposed opposite the leading edge 80, a pressure side 84 axially extending between the leading edge 80 and the trailing edge 82, and a suction side 86 disposed opposite the pressure side 84 and axially extending between the leading edge 80 and the trailing edge 82. A chord length 88 is defined between the leading edge 80 and the trailing edge 82.

The inner platform 72 is located proximate the inner diameter 66. The inner platform 72 includes a radially inwardly extending tab 90. The radially inwardly extending tab 90 extends from the inner platform 72 and connects the vane 62 to an inner sealing member 92.

The inner platform 72 defines an inner cooling passage 94, a plurality of first inner cooling holes 96, a plurality of second inner cooling holes 98, and a plurality of third inner cooling holes 100. The inner cooling passage 94 extends through the tab 90 and the body of the inner platform 72. The inner cooling passage 94 is fluidly connected to an airflow port and/or bleed orifice. The inner cooling passage 94 facilitates air to flow from a cooling air source and onto the inner platform 72 through the plurality of first inner cooling holes 96, the plurality of second inner cooling holes 98, and the plurality of third inner cooling holes 100. The plurality of inner cooling holes may have a cone shape, a rounded shape, an elongated slot shape, as well as other shapes.

Figure 4:
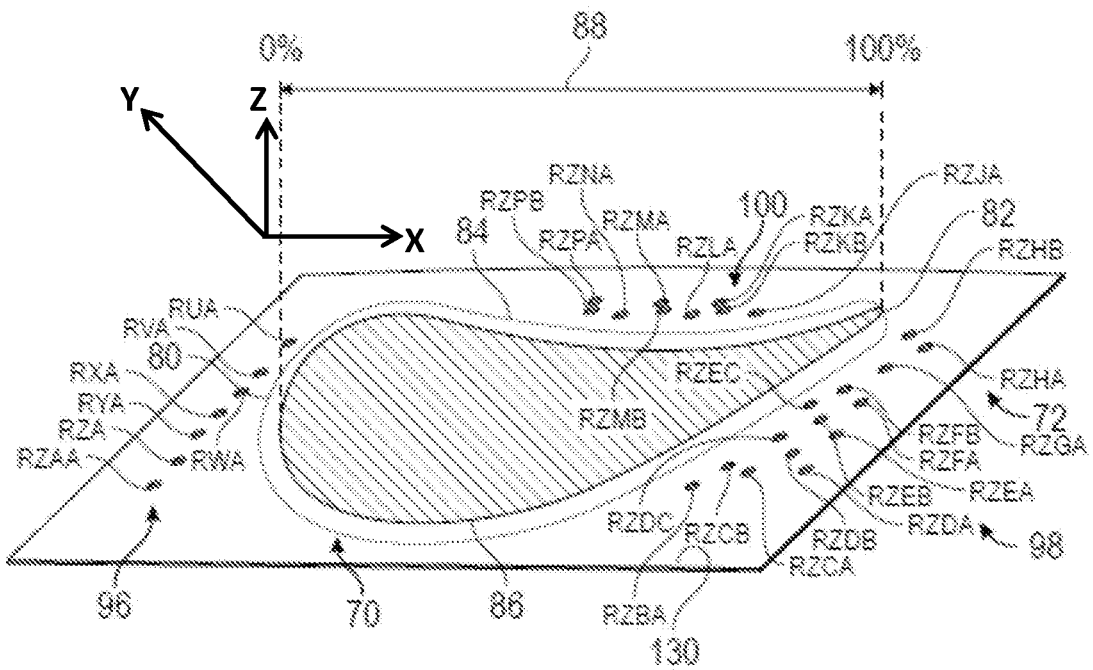
FIG. 4 is an elevation view of an inner platform of the turbine vane along section line 4-4.

Referring to FIG. 4, the plurality of first inner cooling holes 96 are fluidly connected to the inner cooling passage 94. The plurality of first inner cooling holes 96 are disposed proximate the leading edge 80. The plurality of first inner cooling holes 96 extend circumferentially across the inner platform 72 from a point circumferentially spaced apart from the pressure side 84 and extend towards the suction side 86 of the airfoil 70.

The plurality of first inner cooling holes 96 have a first diameter and a first density. The density of the plurality of first inner cooling holes 96 corresponds to a total number of cooling holes within a given area.

The plurality of first inner cooling holes 96 extends generally in a row. The row of the plurality of first inner cooling holes 96 includes cooling holes RUA, RVA, RWA, RXA, RYA, RZA, and RZAA.

The plurality of second inner cooling holes 98 are fluidly connected to the inner cooling passage 94. The plurality of second inner cooling holes 98 are spaced apart from the plurality of first inner cooling holes 96. The plurality of second inner cooling holes 98 are disposed proximate the trailing edge 82 and the suction side 86. The plurality of second inner cooling holes 98 extend from the trailing edge 82 towards the leading edge 80. The plurality of second inner cooling holes 98 extend between 60% and 100% of the chord length 88.

The plurality of second inner cooling holes 98 have a second diameter and a second density. The second diameter of the plurality of second inner cooling holes 98 is greater than the first diameter of the plurality of first inner cooling holes 96. The second density of the plurality of second inner cooling holes 98 is greater than the first density of the plurality of first inner cooling holes 96. The larger diameter and greater density of the plurality of second inner cooling holes 98 facilitates improved or greater cooling of the inner platform 72 to reduce material temperature at the inner platform 72 and therefore mitigate the potential of oxidation on the inner platform 72.

The plurality of second inner cooling holes 98 includes cooling holes RZBA, RZCB, RZCA, RZDA, RZDB, RZDC, RZEA, RZEB, RZEC, RZFA, RZFB, RZGA, RZHA, and RZHB.

The plurality of third inner cooling holes 100 are fluidly connected to the inner cooling passage 94. The plurality of third inner cooling holes 100 are spaced apart from the plurality of first inner cooling holes 96 and the plurality of second inner cooling holes 98. The plurality of third inner cooling holes 100 are disposed proximate the trailing edge 82 and the pressure side 84. The plurality of third inner cooling holes 100 extend from the trailing edge 82 towards the leading edge 80. The plurality of third inner cooling holes 100 extend between 50% and 100% of the chord length 88.

The plurality of third inner cooling holes 100 have a third diameter and a third density. The third diameter of the plurality of third inner cooling holes 100 is greater than the first diameter of the plurality of the first inner cooling holes 96. The third density of the plurality of third inner cooling holes 100 is greater than the first density of the plurality of first inner cooling holes 96. In at least one embodiment the third diameter is equal to the second diameter and the third density is equal to the second density. The larger diameter and greater density of the plurality of third inner cooling holes 100 facilitates improved cooling of the inner platform 72 to reduce material temperature at the inner platform 72 and therefore mitigate the potential of oxidation on the inner platform 72.

The plurality of third inner cooling holes 100 includes cooling holes RZJA, RZKA, RZKB, RZLA, RZMA, RZMB, RZNA, RZPA, and RZPB.

Table 1 identifies each cooling hole of the plurality of first inner cooling holes 96, the plurality of second inner cooling holes 98, and the plurality of third inner cooling holes 100) that are disposed or formed on the inner platform 72. The three or four-letter identifier denotes the row (the first two letters) and the column (the third letter or the third and fourth letters). The number denotes the hole numbers of the cooling hole. The geometric coordinates, $X_i$, $Y_i$, $Z_i$, represent an approximate true position of a nominal part of a center point of the cooling hole.

The geometric coordinates are in accordance with or in substantial conformance with a Cartesian coordinate system that has orthogonally related X, Y, and Z axes. The X axis is defined along the direction of the engine centerline longitudinal axis A, the Y axis is defined in a substantially circumferential or rotational direction about the engine centerline longitudinal axis A, and the Z axis is defined in a radial direction that is substantially perpendicular to the engine centerline longitudinal axis A. Each of the geometric coordinates is measured from a reference point located at an intersection of at least one casting datum and the engine centerline longitudinal axis A. The Cartesian coordinate values are expressed in inches to a center point of each cooling holes. However, the values of Table 1 could be converted to millimeters by multiplying by 25.4, or could be converted to any other units. The cooling holes have a diametrical surface tolerance relative to the specified coordinates of 0.022 inches (0.558 mm) or 0.017 inches (0.431 mm). In other words, due to manufacturing tolerances, the external breakout of the centerline of each cooling hole may fall within a 0.022 inch diameter circle or a 0.017 inch diameter circle inscribed on the surface of the inner platform 72.

TABLE 1

| HOLE # | | $X_i$ | $Y_i$ | $Z_i$ |
|---|---|---|---|---|
| RAA | 1 | −0.854 | 1.801 | 14.464 |
| RBA | 2 | −0.577 | 1.525 | 14.695 |
| RCA | 3 | −0.368 | 1.316 | 14.822 |
| RDA | 4 | −0.155 | 1.103 | 14.907 |
| REA | 5 | 1.307 | −0.639 | 14.898 |
| RFA | 6 | 1.307 | −0.859 | 14.886 |
| RGA | 7 | 1.307 | −1.079 | 14.872 |
| RHA | 8 | 1.307 | −1.299 | 14.854 |
| RJA | 9 | 1.307 | −1.519 | 14.833 |
| RKA | 10 | 1.307 | −1.739 | 14.809 |
| RLA | 11 | 1.307 | −1.959 | 14.782 |
| RMA | 12 | 0.388 | −1.378 | 14.904 |
| RNA | 13 | 0.165 | −1.157 | 14.940 |
| RPA | 14 | −0.054 | −0.937 | 14.939 |
| RRA | 15 | −0.268 | −0.716 | 14.906 |
| RSA | 16 | −0.479 | −0.495 | 14.839 |
| RTA | 17 | −0.685 | −0.274 | 14.737 |
| RUA | 18 | −0.915 | 0.449 | 14.665 |
| RVA | 19 | −0.907 | 0.621 | 14.664 |
| RWA | 20 | −0.905 | 0.771 | 14.658 |
| RXA | 21 | −0.899 | 0.903 | 14.655 |
| RYA | 22 | −0.898 | 1.034 | 14.647 |
| RZA | 23 | −0.887 | 1.182 | 14.644 |
| RZAA | 24 | −0.890 | 1.337 | 14.628 |
| RZBA | 25 | 0.830 | −0.473 | 15.006 |
| RZCA | 26 | 0.963 | −0.672 | 14.988 |
| RZCB | 27 | 0.884 | −0.626 | 14.996 |
| RZDA | 28 | 1.138 | −0.866 | 14.965 |
| RZDB | 29 | 1.036 | −0.866 | 14.973 |
| RZDC | 30 | 0.941 | −0.877 | 14.979 |
| RZEA | 31 | 1.109 | −1.061 | 14.954 |
| RZEB | 32 | 1.012 | −1.062 | 14.962 |
| RZEC | 33 | 0.935 | −1.091 | 14.965 |
| RZFA | 34 | 1.083 | −1.255 | 14.941 |
| RZFB | 35 | 0.993 | −1.256 | 14.948 |
| RZGA | 36 | 1.051 | −1.450 | 14.926 |
| RZHA | 37 | 1.109 | −1.643 | 14.902 |
| RZHB | 38 | 1.024 | −1.631 | 14.910 |
| RZJA | 39 | 0.482 | −1.202 | 14.991 |
| RZKA | 40 | 0.327 | −1.104 | 15.010 |
| RZKB | 41 | 0.355 | −1.073 | 15.010 |
| RZLA | 42 | 0.279 | −0.977 | 15.023 |
| RZMA | 43 | 0.156 | −0.917 | 15.033 |
| RZMB | 44 | 0.185 | −0.887 | 15.034 |
| RZNA | 45 | 0.063 | −0.743 | 15.041 |
| RZPA | 46 | −0.079 | −0.683 | 15.031 |
| RZPB | 47 | −0.051 | −0.654 | 15.036 |

Referring to FIGS. 2-5, the outer platform 74 is located proximate the outer diameter 68. The outer platform 74 is disposed proximate a case 110 that is disposed about the turbine section 28. The outer platform 74 is arranged to operatively connect the vane 62 to the case 110. The outer platform 74 includes a vane hook 112 that extends from the outer platform 74 towards the case 110. The vane hook 112 engages a case hook 114 that extends from the case 110 towards the outer platform 74. The vane hook 112 engages the case hook 114 to secure the vane 62 to the case 110.

The outer platform 74 defines an outer cooling passage 120, a plurality of first outer cooling holes 122, a plurality of second outer cooling holes 124, and a plurality of third outer cooling holes 126. The outer cooling passage 120 extends through the vane hook 112 and the body of the outer platform 74. The outer cooling passage 120 is fluidly connected to an airflow ports and/or a bleed orifice. The outer cooling passage hundred and 20 facilitates air to flow from a cooling air source and onto the outer platform 74 through the plurality of first outer cooling holes 122, the plurality of second outer cooling holes 124, and the plurality of third outer cooling holes 126. The plurality of outer cooling holes may have a cone shape, a rounded shape, an elongated slot shape, as well as other shapes.

Figure 5:
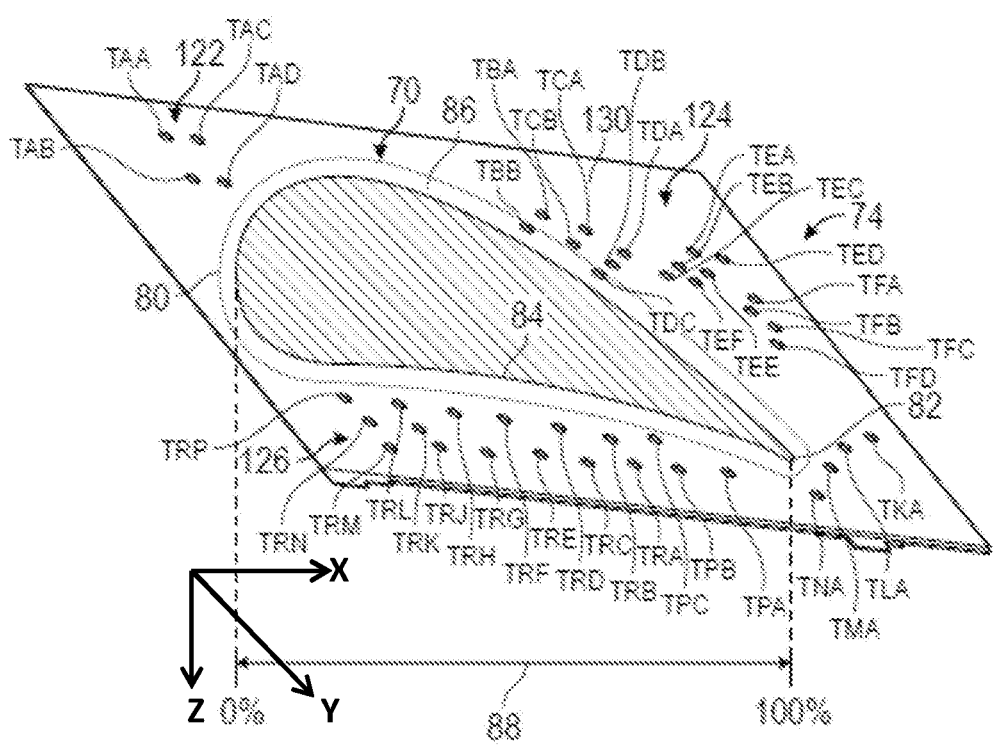
FIG. 5 is an elevation view of an outer platform of the turbine vane along section line 5-5.

Referring to FIG. 5, the plurality of first outer cooling holes 122 are fluidly connected to the outer cooling passage 120. The plurality of first outer cooling holes 122 are disposed proximate the leading edge 80. The plurality of first outer cooling holes 122 and are spaced apart from the pressure side 84 and the suction side 86.

The plurality of first outer cooling holes 122 has a first diameter that is equal to the first diameter of the plurality of first inner cooling holes 96. The plurality of first outer cooling holes 122 have a first density that is equal to the first density of the plurality of first inner cooling holes 96.

The plurality of first outer cooling holes 122 includes cooling holes TAA, TAB, TAC, and TAD.

The plurality of second outer cooling holes 124 are fluidly connected to the outer cooling passage 120. The plurality of second outer cooling holes 124 are spaced apart from the plurality of first outer cooling holes 122. The plurality of second outer cooling holes 124 are disposed proximate the trailing edge 82 and the suction side 86. The plurality of second outer cooling holes 124 extend from the trailing edge 82 towards the leading edge 80. In at least one embodiment, the plurality of second outer cooling holes 124 is spaced apart from the trailing edge 82. The plurality of second outer cooling holes 124 extend between 50% and 90% of the chord length 88.

The plurality of second outer cooling holes 124 have a second diameter and a second density. The second diameter of the plurality of second outer cooling holes 124 is greater than the diameter of the plurality of first outer cooling holes 122. The second density of the plurality of second outer cooling holes 124 is greater than the density of the plurality of first outer cooling holes 122. The larger diameter and greater density of the plurality of second outer cooling holes 124 facilitates improved cooling of the outer platform 74 to reduce material temperature at the outer platform 74 and therefore mitigates the potential of oxidation on the outer platform 74.

The plurality of second outer cooling holes 124 includes cooling holes TBB, TBA, TCB, TCA, TDC, TDB, TDA, TEA, TEB, TEC, TED, TEE, TEF, TFA, TFB, TFC, TFD, TKA, TLA, TMA, and TNA.

The plurality of third outer cooling holes 126 are fluidly connected to the outer cooling passage 120. The plurality of third outer cooling holes 126 are spaced apart from the plurality of first outer cooling holes 122 and the plurality of second outer cooling holes 124. The plurality of third outer cooling holes 126 are disposed proximate the pressure side 84. The plurality of third outer cooling holes 126 extend between the leading edge 80 and the trailing edge 82. The plurality of third outer cooling holes 126 extend beyond the trailing edge 82 and wrap around and extend towards the suction side 86. The plurality of third outer cooling holes 126 extend between 0% and 100% of the chord length 88. In at least one embodiment, the plurality of third outer cooling holes 126 extends between 15% and 90% of the chord length 88.

The plurality of third outer cooling holes 126 have a third diameter and a third density. The third diameter of the plurality of third outer cooling holes 126 is substantially similar to the diameter of the plurality of first outer cooling holes 122. The third density of the plurality of third outer cooling holes 126 is substantially similar to the density of the plurality of first outer cooling holes 122.

Table 2 identifies each cooling hole of the plurality of first outer cooling holes 122, the plurality of second outer cooling holes 124, and the plurality of third outer cooling holes 126 that are disposed or formed on the outer platform 74. The three-letter identifier denotes the row (the first two letters) and the column (the third letter). The number denotes the hole number of the cooling hole. The geometric coordinates, Xo, Yo, Zo, represent an approximate true position of a nominal part of a center point of the cooling hole.

The geometric coordinates are in accordance with or in substantial conformance with a Cartesian coordinate system that has orthogonally related X, Y, and Z axes. The X axis is defined along the direction of the engine centerline longitudinal axis A, the Y axis is defined in a substantially circumferential or rotational direction about the engine centerline longitudinal axis A, and the Z axis is defined in a radial direction that is substantially perpendicular to the engine centerline longitudinal axis A. Each of the geometric coordinates is measured from the reference point located at the intersection of at least one casting datum and the engine centerline longitudinal axis A. The reference point for the locations of the plurality of outer cooling holes may be the same reference point for the locations of the plurality of inner cooling holes. The Cartesian coordinate values are expressed in inches. However, the values of Table 2 could be converted to millimeters by multiplying by 25.4, or could be converted to any other units. The cooling holes have a diametrical surface tolerance relative to the specified coordinates of 0.022 inches (0.558 mm) or 0.017 inches (0.431 mm). In other words, due to manufacturing tolerances, the external breakout of the centerline of each cooling hole may fall within a 0.022 inch diameter circle or a 0.017 inch diameter circle inscribed on the surface of the outer platform 74.

TABLE 2

| | HOLE # | Xo | Yo | Zo |
|---|---|---|---|---|
| TAA | 1 | −0.585 | 1.216 | 18.020 |
| TAB | 2 | −0.603 | 0.960 | 18.039 |
| TAC | 3 | −0.469 | 1.116 | 18.000 |
| TAD | 4 | −0.486 | 0.875 | 18.017 |
| TBA | 5 | 0.645 | −0.262 | 17.783 |
| TBB | 6 | 0.552 | −0.252 | 17.795 |
| TCA | 7 | 0.781 | −0.440 | 17.750 |
| TCB | 8 | 0.676 | −0.439 | 17.772 |
| TDA | 9 | 0.845 | −0.629 | 17.736 |
| TDB | 10 | 0.764 | −0.637 | 17.747 |
| TDC | 11 | 0.685 | −0.650 | 17.754 |
| TEA | 12 | 1.093 | −0.821 | 17.727 |
| TEB | 13 | 0.979 | −0.821 | 17.727 |
| TEC | 14 | 0.862 | −0.824 | 17.727 |
| TED | 15 | 1.225 | −1.019 | 17.717 |
| TEE | 16 | 1.134 | −1.017 | 17.717 |
| TEF | 17 | 1.043 | −1.019 | 17.717 |
| TFA | 18 | 1.210 | −1.185 | 17.706 |
| TFB | 19 | 1.154 | −1.215 | 17.704 |
| TFC | 20 | 1.201 | −1.344 | 17.695 |
| TFD | 21 | 1.161 | −1.419 | 17.689 |
| TKA | 22 | 1.252 | −2.003 | 17.632 |
| TLA | 23 | 1.126 | −2.028 | 17.629 |
| TMA | 24 | 1.007 | −2.068 | 17.624 |
| TNA | 25 | 0.895 | −2.120 | 17.618 |
| TPA | 26 | 0.599 | −1.768 | 17.707 |
| TPB | 27 | 0.425 | −1.611 | 17.761 |
| TPC | 28 | 0.409 | −1.408 | 17.782 |
| TRA | 29 | 0.257 | −1.458 | 17.812 |
| TRB | 30 | 0.243 | −1.275 | 17.829 |
| TRC | 31 | 0.082 | −1.300 | 17.863 |
| TRD | 32 | 0.065 | −1.086 | 17.882 |

TABLE 2-continued

| | HOLE # | Xo | Yo | Zo |
|---|---|---|---|---|
| TRE | 33 | −0.093 | −1.142 | 17.914 |
| TRF | 34 | −0.112 | −0.898 | 17.932 |
| TRG | 35 | −0.268 | −0.984 | 17.962 |
| TRH | 36 | −0.289 | −0.712 | 17.980 |
| TRJ | 37 | −0.443 | −0.825 | 18.010 |
| TRK | 38 | −0.454 | −0.677 | 18.019 |
| TRL | 39 | −0.466 | −0.530 | 18.026 |
| TRM | 40 | −0.618 | −0.667 | 18.056 |
| TRN | 41 | −0.630 | −0.515 | 18.063 |
| TRP | 42 | −0.641 | −0.364 | 18.070 |

A thermal barrier coating 130 may be applied to at least one of the inner platform 72 and the outer platform 74. The thermal barrier coating 130 may be applied to the platforms after the forming or drilling of the plurality of cooling holes.

The term "about" or "approximate" is intended to include the degree of error associated with measurement of the particular quantity based upon the equipment available at the time of filing the application. For example, "about" or "approximate" can include a range of ±8% or 5%, or 2% of a given value.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine vane for a gas turbine engine, comprising:
   an engine centerline; and
   an inner platform and an outer platform joined together by an airfoil, the airfoil including a leading edge and a trailing edge joined together by a pressure side and a suction side disposed opposite the pressure side,
   the inner platform defines a plurality of inner cooling holes at geometric coordinates in conformance with Cartesian coordinate values of Xi, Yi, and Zi as set forth in Table 1, wherein each of the geometric coordinates is measured from the engine centerline, the Cartesian coordinate values of Table 1 are expressed in inches, the cooling holes have a diametrical surface tolerance relative to the coordinates of at least 0.017 inches (0.431 mm).

2. The turbine vane of claim 1, wherein the plurality of inner cooling holes includes a plurality of first inner cooling holes and a plurality of second inner cooling holes that are fluidly connected to an inner cooling passage, the plurality of first inner cooling holes being disposed proximate the leading edge and extending towards the suction side and the plurality of second inner cooling holes being disposed proximate the trailing edge and the suction side and extending towards the leading edge.

3. The turbine vane of claim 2, wherein the plurality of inner cooling holes further includes a plurality of third inner cooling holes that are fluidly connected to the inner cooling passage and are disposed proximate the trailing edge and the pressure side and extend towards the leading edge.

4. The turbine vane of claim 3, wherein the plurality of first inner cooling holes has a first diameter and the plurality of second inner cooling holes has a second diameter that is less than the first diameter.

5. The turbine vane of claim 1, wherein the outer platform defines a plurality of outer cooling holes at geometric coordinates in substantial conformance with Cartesian coordinate values of Xo, Yo, Zo as set forth in Table 2, wherein each of the geometric coordinates is measured from the engine centerline, the Cartesian coordinate values of Table 2 are expressed in inches, the cooling holes have a diametrical surface tolerance relative to the coordinates of at least 0.017 inches (0.431 mm).

6. The turbine vane of claim 5, wherein the plurality of outer cooling holes includes a plurality of first outer cooling holes and a plurality of second outer cooling holes that are fluidly connected to an outer cooling passage, the plurality of first outer cooling holes being disposed proximate the leading edge, and the plurality of second outer cooling holes being disposed proximate the trailing edge and the suction side extending towards the leading edge.

7. The turbine vane of claim 6, wherein the plurality of outer cooling holes further includes a plurality of third outer cooling holes that are fluidly connected to the outer cooling passage, the plurality of third outer cooling holes are disposed proximate the pressure side and extend between the leading edge and the trailing edge.

8. The turbine vane of claim 7, wherein a portion of the plurality of third outer cooling holes extend beyond the trailing edge and extend towards the suction side.

9. The turbine vane of claim 7, wherein the plurality of first outer cooling holes has a first diameter and the plurality of second outer cooling holes has a second diameter that is less than the first diameter.

10. A turbine vane for a gas turbine engine, comprising:
an engine longitudinal axis;
an inner platform;
an outer platform spaced apart from the inner platform, the outer platform defines a plurality of outer cooling holes at geometric coordinates in conformance with Cartesian coordinate values of Xo, Yo, Zo as set forth in Table 2, wherein each of the geometric coordinates is measured from the engine longitudinal axis, the Cartesian coordinate values of Table 2 are expressed in inches, the cooling holes have a diametrical surface tolerance relative to the coordinates of at least 0.017 inches (0.431 mm); and
an airfoil having a chord length defined between a leading edge and a trailing edge, the airfoil joining the inner platform to the outer platform.

11. The turbine vane of claim 10, wherein the inner platform defines a plurality of inner cooling holes at geometric coordinates in conformance with Cartesian coordinate values of Xi, Yi, and Zi as set forth in Table 1, wherein each of the geometric coordinates is measured from the engine longitudinal axis, the Cartesian coordinate values of Table 1 are expressed in inches, the cooling holes have a diametrical surface tolerance relative to the coordinates of at least 0.017 inches (0.431 mm).

12. The turbine vane of claim 11, wherein the plurality of inner cooling holes includes a plurality of first inner cooling holes that extend circumferentially across the inner platform and are disposed proximate the leading edge.

13. The turbine vane of claim 12, wherein the plurality of inner cooling holes includes a plurality of second inner cooling holes that extend between 60% and 100% of the chord length.

14. The turbine vane of claim 13, wherein the plurality of inner cooling holes includes a plurality of third inner cooling holes that extend between 50% and 100% of the chord length.

15. The turbine vane of claim 10, wherein the plurality of outer cooling holes includes a plurality of first outer cooling holes that extend circumferentially across the inner platform and are disposed proximate the leading edge.

16. The turbine vane of claim 15, wherein the plurality of outer cooling holes includes a plurality of second outer cooling holes that extend between 50% and 100% of the chord length.

17. The turbine vane of claim 16, wherein the plurality of outer cooling holes includes a plurality of third outer cooling holes that extend between 0% and 100% of the chord length.

18. A gas turbine engine, comprising:
a turbine section disposed adjacent to a combustor section, the turbine section including:
a turbine vane having an inner platform and an outer platform joined together by an airfoil having a pressure side and a suction side each extending between a leading edge and a trailing edge to define a chord length,
the inner platform defines a plurality of first inner cooling holes, a plurality of second inner cooling holes and a plurality of third inner cooling holes,
the plurality of first inner cooling holes being disposed proximate the leading edge and extend across the inner platform in a circumferentially oriented array from a point circumferentially spaced from the pressure side and towards the suction side,
the plurality of second inner cooling holes being disposed proximate the trailing edge and the suction side to extend between 60% and 100% of the chord length with a density exceeding that of the plurality of first inner cooling holes, and
the plurality of third inner cooling holes being disposed proximate the trailing edge and the pressure side to extend between 50% and 100% of the chord length with a density equaling that of the plurality of second inner cooling holes.

19. The gas turbine engine of claim 18, wherein:
the outer platform defines a plurality of first outer cooling holes, a plurality of second outer cooling holes and a plurality of third outer cooling holes,
the plurality of first outer cooling holes being disposed proximate the leading edge with a density equaling that of the plurality of first inner cooling holes,
the plurality of second outer cooling holes being disposed proximate the trailing edge and the suction side to extend between 60% and 100% of the chord length with a density exceeding that of the plurality of first outer cooling holes, and
the plurality of third outer cooling holes being disposed proximate the suction side and wrap around the trailing edge and extends towards the suction side to extend between 15% and 90% of the chord length with a density equaling that of the plurality of first outer cooling holes.

20. The gas turbine engine of claim 19, wherein the plurality of first outer cooling holes has a first diameter and the plurality of second outer cooling holes has a second diameter that is less than the first diameter.

\* \* \* \* \*